United States Patent
Cannon (10) Patent No.: US 12,202,401 B2
(45) Date of Patent: Jan. 21, 2025

(54) INTERIOR TRIM PART OF A MOTOR VEHICLE

(71) Applicant: International Automotive Components Group GmbH, Duesseldorf (DE)

(72) Inventor: Carter Scott Cannon, Munich (DE)

(73) Assignee: International Automotive Components Group NA, Inc., Southfield, MI (US)

( * ) Notice: Subject to any disclaimer, the term of this patent is extended or adjusted under 35 U.S.C. 154(b) by 0 days.

(21) Appl. No.: 15/483,504

(22) Filed: Apr. 10, 2017

(65) Prior Publication Data
US 2017/0291536 A1 Oct. 12, 2017

(30) Foreign Application Priority Data
Apr. 11, 2016 (DE) ..................... 10 2016 106 539.0

(51) Int. Cl.
*B60Q 3/208* (2017.01)
*B32B 3/08* (2006.01)
(Continued)

(52) U.S. Cl.
CPC ............... *B60Q 3/208* (2017.02); *B32B 3/08* (2013.01); *B32B 3/266* (2013.01); *B32B 5/022* (2013.01);
(Continued)

(58) Field of Classification Search
CPC .......... B60Q 3/20; B60Q 3/208; B60Q 3/217; B60Q 3/233; B60Q 3/242; B60Q 3/252;
(Continued)

(56) References Cited

U.S. PATENT DOCUMENTS

| 5,339,550 A | * | 8/1994 | Hoffman | B60Q 1/503 |
| | | | | 362/497 |
| 5,692,327 A | * | 12/1997 | Wynne | B60Q 1/56 |
| | | | | 362/812 |

(Continued)

FOREIGN PATENT DOCUMENTS

| DE | 102010036795 A1 * | 2/2012 | ......... B60R 13/0212 |
| EP | 2208645 A1 * | 7/2010 | ............... B60Q 3/14 |

(Continued)

OTHER PUBLICATIONS

Atkinson, et al: "The heat is on: Don't leave your chocolate candy, kids or pets in a parked car"; 2015 publication of the Society of Automotive Engineers (May 13, 2015) (13 pgs) <<https://www.sae.org/standardsdev/tsb/cooperative/int_temp.pdf>> (accessed Jan. 6, 2020).

(Continued)

*Primary Examiner* — Colin J Cattanach
(74) *Attorney, Agent, or Firm* — Grossman, Tucker, Perreault & Pfleger, PLLC; Steven J. Grossman (57) ABSTRACT

The disclosure relates to an interior trim part of a motor vehicle, which includes a support layer (10), a cover layer (14) on a front side of the support layer and an illumination unit (16-26) on an opposite rear side of the support layer. The support layer includes a perforation (12), which forms an illuminated structure when the illumination unit emits light through the perforation.

27 Claims, 5 Drawing Sheets

(51) Int. Cl.

| | | |
|---|---|---|
| B32B 3/26 | (2006.01) | |
| B32B 5/02 | (2006.01) | |
| B32B 5/18 | (2006.01) | |
| B32B 5/24 | (2006.01) | |
| B32B 5/26 | (2006.01) | |
| B32B 7/12 | (2006.01) | |
| B32B 9/02 | (2006.01) | |
| B32B 9/04 | (2006.01) | |
| B32B 17/10 | (2006.01) | |
| B32B 27/12 | (2006.01) | |
| B32B 27/40 | (2006.01) | |
| B60Q 3/20 | (2017.01) | |
| B60Q 3/217 | (2017.01) | |
| B60Q 3/267 | (2017.01) | |
| B60Q 3/54 | (2017.01) | |
| B60Q 3/80 | (2017.01) | |
| B60R 13/02 | (2006.01) | |
| G09F 13/04 | (2006.01) | |
| B60Q 3/14 | (2017.01) | |
| B60Q 3/233 | (2017.01) | |
| B60Q 3/242 | (2017.01) | |
| B60Q 3/252 | (2017.01) | |
| B60Q 3/68 | (2017.01) | |
| G09F 13/16 | (2006.01) | |

(52) U.S. Cl.
CPC .............. *B32B 5/024* (2013.01); *B32B 5/026* (2013.01); *B32B 5/18* (2013.01); *B32B 5/245* (2013.01); *B32B 5/26* (2013.01); *B32B 7/12* (2013.01); *B32B 9/025* (2013.01); *B32B 9/047* (2013.01); *B32B 27/12* (2013.01); *B32B 27/40* (2013.01); *B60Q 3/54* (2017.02); *B60Q 3/80* (2017.02); *B60R 13/0212* (2013.01); *B60R 13/0231* (2013.01); *B32B 17/10541* (2013.01); *B32B 2262/02* (2013.01); *B32B 2262/0246* (2013.01); *B32B 2307/414* (2013.01); *B32B 2605/003* (2013.01); *B60Q 3/14* (2017.02); *B60Q 3/20* (2017.02); *B60Q 3/217* (2017.02); *B60Q 3/233* (2017.02); *B60Q 3/242* (2017.02); *B60Q 3/252* (2017.02); *B60Q 3/267* (2017.02); *B60Q 3/68* (2017.02); *B60R 2013/0287* (2013.01); *G09F 13/04* (2013.01); *G09F 13/16* (2013.01)

(58) Field of Classification Search
CPC . B60Q 3/267; B60Q 3/14; B60Q 3/54; B60Q 3/68; B60Q 2500/10; G09F 13/04; G09F 13/06; B32B 17/10541
See application file for complete search history.

(56) References Cited

U.S. PATENT DOCUMENTS

| | | | | |
|---|---|---|---|---|
| 7,387,397 B2 * | 6/2008 | Konet | .................. | B60R 13/00 362/603 |
| 7,441,931 B2 * | 10/2008 | Bayersdorfer | ......... | B60K 35/00 362/489 |
| 8,016,465 B2 * | 9/2011 | Egerer | .................. | B60R 13/02 362/489 |
| 9,016,910 B2 * | 4/2015 | Bingle | .................. | B60R 13/005 362/459 |
| 11,428,107 B2 | 8/2022 | Shi | | |
| 11,532,825 B2 | 12/2022 | Fujsaki et al. | | |
| 2002/0101738 A1 * | 8/2002 | Misaras | .................. | B60Q 3/14 362/487 |
| 2005/0195614 A1 * | 9/2005 | Bayersdorfer | ...... | F16H 59/0278 362/545 |
| 2006/0061138 A1 * | 3/2006 | Radu | .................. | B60R 13/02 296/201 |
| 2006/0176710 A1 * | 8/2006 | Meinke | .................. | B60Q 1/2669 362/503 |
| 2009/0059610 A1 * | 3/2009 | Marshall | .................. | F21K 9/00 362/470 |
| 2009/0257241 A1 * | 10/2009 | Meinke | .................. | B60Q 1/2669 362/546 |
| 2010/0154261 A1 * | 6/2010 | Bozlo | .................. | B60R 13/005 40/541 |
| 2010/0214795 A1 * | 8/2010 | Salter | .................. | B60Q 3/54 362/488 |
| 2010/0296302 A1 * | 11/2010 | Welch, Sr. | ............. | B60R 13/00 362/471 |
| 2010/0321922 A1 * | 12/2010 | Zeinstra | .................. | G09F 13/04 362/89 |
| 2011/0002138 A1 | 1/2011 | Hayes et al. | | |
| 2012/0327673 A1 * | 12/2012 | Ureta Hortiguela | ........................ | B60R 13/0225 362/490 |
| 2013/0026504 A1 * | 1/2013 | Marx | .................. | B60Q 3/225 257/E33.064 |
| 2014/0098547 A1 * | 4/2014 | Kostelnik | .................. | B60Q 3/78 362/311.02 |
| 2015/0210226 A1 * | 7/2015 | Topart | .................. | B60Q 3/54 362/511 |
| 2015/0217681 A1 * | 8/2015 | Dellock | .................. | B60Q 1/2696 362/510 |
| 2015/0274066 A1 * | 10/2015 | Del Pozo Gonzalez | .................. | B60R 13/02 362/551 |
| 2015/0274067 A1 * | 10/2015 | Salter | .................. | B60Q 3/80 362/510 |
| 2015/0291085 A1 * | 10/2015 | Manning | ............. | B60Q 1/2619 362/516 |
| 2015/0307033 A1 * | 10/2015 | Preisler | .................. | B60R 13/02 362/488 |
| 2015/0375677 A1 * | 12/2015 | Salter | .................. | F21V 9/32 362/510 |
| 2016/0325674 A1 * | 11/2016 | Krull | .................. | G02B 6/001 |
| 2017/0182936 A1 * | 6/2017 | Kawamata | ............. | B60R 13/02 |
| 2017/0228126 A1 * | 8/2017 | Kim | .................. | B60Q 3/14 |
| 2018/0065547 A1 * | 3/2018 | Kirilenko | .................. | G09F 13/04 |

FOREIGN PATENT DOCUMENTS

| | | | | |
|---|---|---|---|---|
| EP | 2 269 797 A1 | 1/2011 | | |
| WO | WO 2006057531 A1 * | 6/2006 | ............. | B60N 3/048 |
| WO | WO 2012033600 A1 * | 3/2012 | ............. | G06F 13/22 |

OTHER PUBLICATIONS 2012 publication of SGS Group Management SA entitled "Car Interior Material Testing Methods"; <<https://www.yumpu.com/en/document/read/5877335/car-interior-material-sgs>> (21 pgs) (accessed Jan. 6, 2020).

* cited by examiner

INTERIOR TRIM PART OF A MOTOR VEHICLE

The disclosure relates to an interior trim part of a motor vehicle and more specifically an interior trim part with a function for the selective illumination of a portion of its front face or of its entire front face.

An illuminated interior trim part is known for example from EP 2 269 797 A1. This document describes an interior trim part of a motor vehicle having a support layer of synthetic material and an outer layer of translucent synthetic material, wherein the outer layer is provided with a sprue or gating at its edge, and this sprue serves for the coupling in of light. A translucent decorative cover layer can be provided over the translucent layer.

The quality of interior trim parts substantially influences the value of motor vehicles, wherein illuminated interior trim parts are becoming increasingly widespread, because they not only fulfill aesthetic purposes, but also undertake a technically functional task. They can be used as ambient lighting, orientation lighting or also as functional lighting, e.g. for reading. Illuminated interior trim parts can line an entire functional unit, for example for lining the instrument panel, doors, side walls, columns, center console or as a roof lining, or they can be provided in the form of one or more inserts in such trim parts.

An interior trim part of a motor vehicle is provided, which comprises a support layer, a cover layer on a front side of the support layer and an illumination unit on an opposite rear side of the support layer. The support layer includes a perforation, which forms an illuminated structure, when the illumination unit emits light through the perforation. The interior trim part can be, in particular, part of a roof lining or of a roof element of a panorama window or glasshouse window of a motor vehicle. The support layer can be opaque, in general, and allows light to only pass through in the region of the perforation. The perforation can comprise punctiform and/or linear openings, which are arranged e.g. in the form of a regular pattern, an image or a lettering.

A variety of patterns, structures, images, letterings and other configurations can be formed in the support layer of the interior trim part, which are only visible on the visible side (A side) of the interior trim part when light passes through the perforation. As the perforation is covered by the cover layer, the openings are not noticeable in the non-illuminated state, but rather the interior trim part has a uniformly closed surface. This is known as "hidden-until-lit".

The perforation can be produced in the support layer in a simple manner, for example by water jet cutting, laser cutting or punching. Water jet cutting or laser cutting allow the patterns, structures, images, letterings and the like, formed by the perforation, to be varied in an uncomplicated manner and to be adapted to customers' wishes, by the cutting tools being actuated e.g. by means of a CAD control system.

The illumination unit can be embedded at least partially into the rear side of the support layer, in order to achieve an overall flat structure of the interior trim part. A variety of different illumination units can come into use as light source and light conductor, including at least an LED light source, including OLEDs, a light conductor, an electroluminescence foil and a light-conducting textile, to name only a few examples. In some embodiments, the illumination unit also can emit light of different color. By varying the brightness or color and/or sequential actuation of several light sources, the impression of dynamics, movement and/or animation can be produced.

The illumination unit can be arranged and actuated so that different regions of the perforation are illuminated in time sequence. For this purpose, a control unit can be associated with the illumination unit, which control unit selectively actuates different parts of the illumination unit in order to selectively illuminate different regions of the perforation. For example, a plurality of LEDs or a plurality of portions of an EL foil or of a light-conducting textile can be actuated independently of one another. Thereby, particularly attractive illumination effects, and an illumination at the location where it is required, can be achieved.

The cover layer is at least partially transparent or translucent and in different embodiments can comprise one or more layers, including: a textile, a non-woven material, a woven material, a knitted material, a foil, a synthetic leather, a perforated leather, a foam layer, a spacer layer and a lacquer layer.

In addition, a translucent stabilizing layer, for example a synthetic material film, a non-woven material, a woven material or a knitted material, can be applied onto the support layer, at least in the region of the perforation. The stabilizing layer can be applied onto the front side or onto the rear side of the support layer.

On the rear side of the illumination unit in addition a covering layer can be applied, which prevents the emergence of light on the rear side of the interior trim part and optionally includes optically effective elements, for example a reflector layer.

In addition to the perforation, for the formation of the decorative illuminated structure, the cover layer also can have an image, a pattern or a lettering. When the cover layer is configured so as to be multi-layered, the image, the pattern or the lettering can be formed in different layers of the cover layer, in order to obtain a three-dimensional effect, such as for example a moiré effect.

In the context of this application, impervious to light or opaque means a transparency of 0% or almost 0%; light-transmissive or transparent means a transparency of 100% or almost 100%; and partially light-transmissive or translucent means a transparency in the range of 10% to approximately 80%. Various methods can be used for determining the transparency. For example, an opacimeter can be used, which uses a source of visible light for measuring the amount of the visible light which is absorbed or reflected by a sample. The amount of the absorbed light is determined on a scale of 0-100 measurement units, in order to derive the transparency. The light can have a wavelength spectrum in the range of 400 nm to 700 nm. Alternatively, the light transmission of the material can be measured by infrared spectroscopy, wherein infrared radiation is sent through a sample. The resulting spectrum corresponds to the ratio of absorption and transmission, from which in turn the transparency can be derived.

Various examples are explained below with reference to the drawings, wherein.

Figure 1:
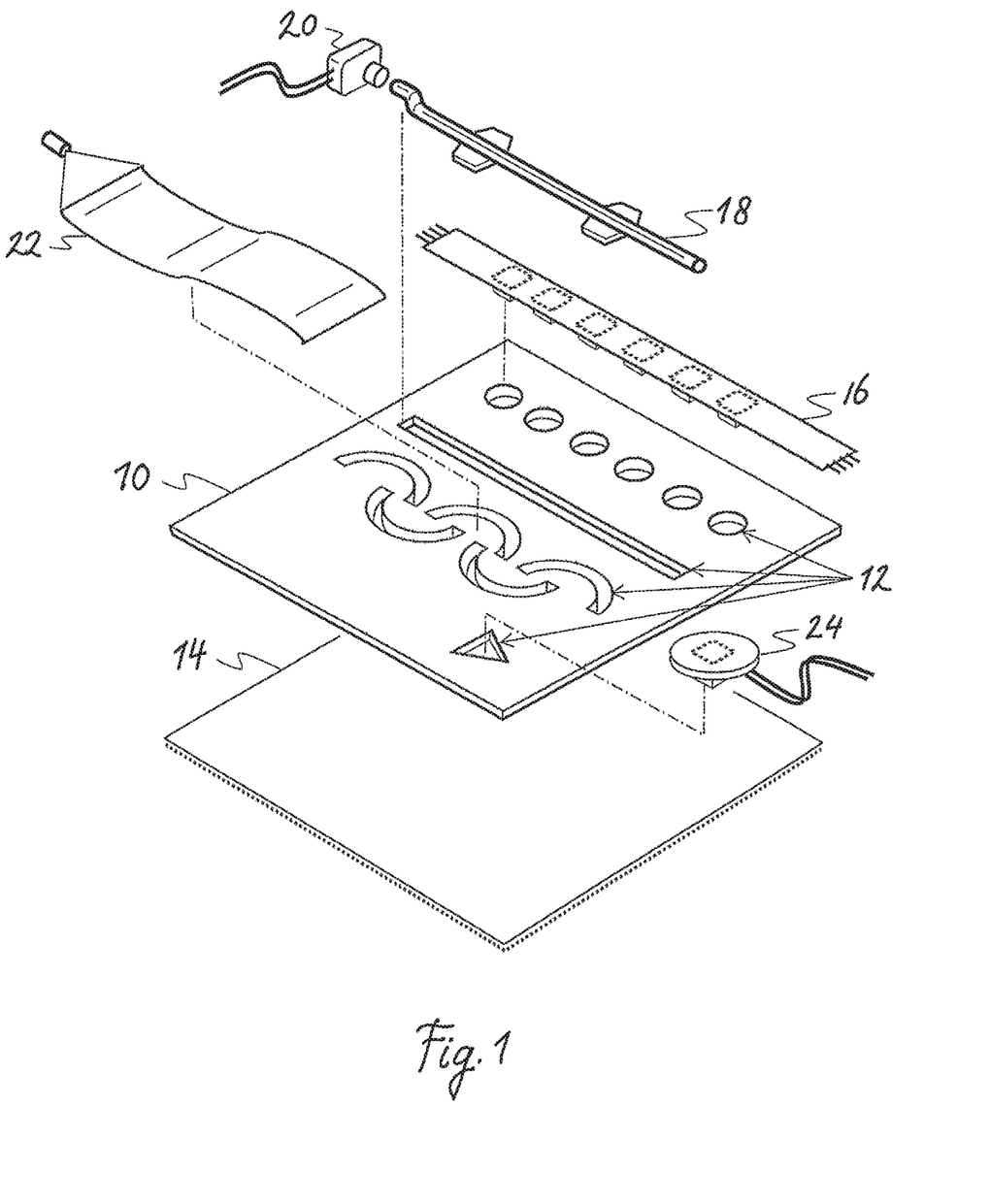
FIG. 1 shows an exploded view of an interior trim part according to an example.

FIG. 1 shows a perspective exploded view of an interior trim part according to an example. The interior trim part shown in FIG. 1 comprises a support layer 10, in which various types of perforations 12 can be formed, wherein FIG. 1 shows by way of example perforations in the form of circular holes, of a line, of curved shapes and of a triangular shape. The perforations shown in FIG. 1 serve merely as an example for a multiplicity of possible regular and irregular patterns and structures, images, letterings and the like. The perforations 12 can be produced in various ways: If the support layer 10 is an injection molded part, the perforations can be formed e.g. by cutting directly in the injection molding process. Furthermore, the perforations can be produced, irrespective of the type of support layer 10, by punching, water jet cutting, laser cutting or also by manually cutting. The support layer 10 can be produced as an injection molded part from synthetic material or as a pressed fiber-reinforced sheet, to name only two examples.

Onto the front side of the support layer 10, in the art referred to as B side, a cover layer 14 is applied, which can form the visible face of the interior trim part, in the art referred to as A side. The cover layer can be configured so as to be single-layered or multi-layered and is partially transparent or translucent. The cover layer 14 can comprise at least one of the following layers: a textile, a synthetic foil, for example of PVC, synthetic leather, perforated leather, a spacer layer, a foam layer, a lacquer layer. The cover layer 14 and the support layer 16 can be glued to one another.

On the rear side of the support layer 10, in the art referred to as C side, one or more identical or different illumination units are arranged. The example of FIG. 1 shows four different illumination units, namely an LED strip 16, a light conductor 18 with an LED module 20 connected thereto, a light-conducting textile 22 and a housed LED module 24. In several embodiments, only one type of light source will be provided, if applicable combined with a light conductor, wherein, however, different illumination units also can be combined. Depending on the shape and size of the perforation and the desired illumination, different types of illumination units and light conductors can be combined, wherein in particular LEDs, OLEDs, laser diodes and electroluminescence (EL) light sources may be considered to be used as light source. For example, optical waveguides formed by injection molding or extruded optical waveguides, rigid and flexible optical waveguides, light-conducting foils and sheets can be combined with the light sources. Light-conducting textiles also can be used, for example woven or knitted textiles of synthetic material optical waveguides (polymeric optical fibers; POF) of PMMA. LEDs can be used as individual LEDs or in the form of LED modules, an LED strip, an LED matrix, an LED array or an LED light box. The illumination unit can emit single-colored or multi-colored light, for example LEDs of different color or RGB LEDs can be used.

The illumination unit can be integrated at least partially into the rear side of the support layer 10, by for example individual LEDs of the LED strip 16 or the LED module 24 being inserted into the perforation 12. The illumination unit can be connected, in addition, with a control device, in order to selectively switch on and off the entire illumination unit or individual illumination components, for example individual LEDs. Here, either the entire illumination unit can be switched on and off and also dimmed, or individual illumination components, for example individual LEDs, can be activated in a sequence, in order to generate a moving light pattern.

Figure 2:
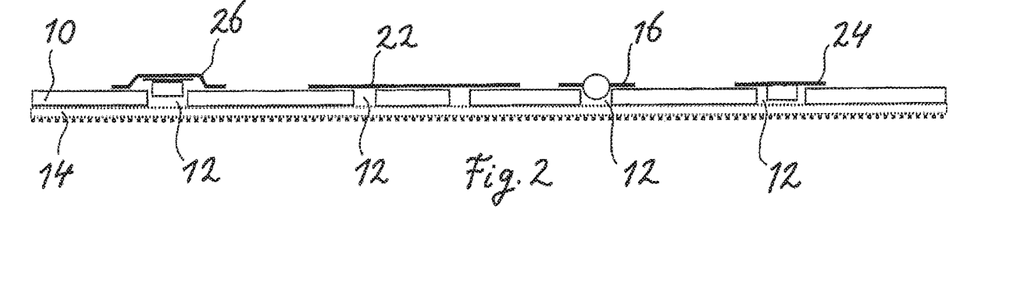
FIG. 2 shows a sectional view through an interior trim part according to an example.

FIG. 2 shows a sectional view through an interior trim part according to an example. In FIG. 2 the interior trim part is illustrated having the support layer 10 and the cover layer 14. The support layer 10 includes a perforation 12 which forms differently shaped openings in the support layer 10. In this view, it also can be seen that the cover layer 14 can consist of several layers, including a foam material layer or spacer layer and a decorative layer, for example a foil, a non-woven material, a woven material, a knitted material, a synthetic leather or a perforated leather. Between the support layer 10 and the cover layer 14 in the region of the perforation 12 an additional light-forming element can be provided, for example a light-forming film, a foil or a strip (not shown). Such an element can for example scatter or bundle the light exiting through the perforation.

FIG. 2 shows by way of example various illumination units in sectional view, including an LED strip 16, a light-conducting textile 22 and a housed LED module 24. In addition, an LED light box 26 is shown. The illumination units are embedded at least partially into the rear side of the support layer 10.

Figures 3A, 3B:
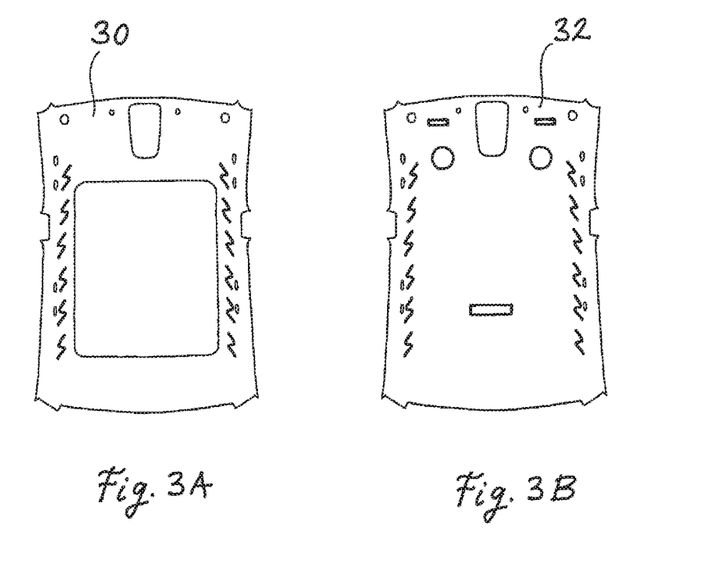
FIGS. 3A and 3B show top views onto two examples of interior trim parts.

FIGS. 3A and 3B show two interior trim parts according to an example, namely a roof lining 30 for a motor vehicle having a sunroof or panorama window and a continuous roof lining 32, by way of example. In FIGS. 3A and 3B illuminated perforations of the support layer are indicated by lighter regions. The illuminated perforations can have a decorative character, but also provide an ambient light, a functional light or an orientation light.

Figure 4A:
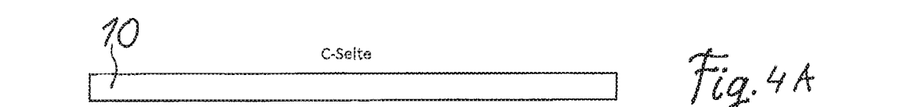
FIGS. 4A to 4G show step by step various stages of a method for the production of an interior trim part according to an example.
Figure 4B:
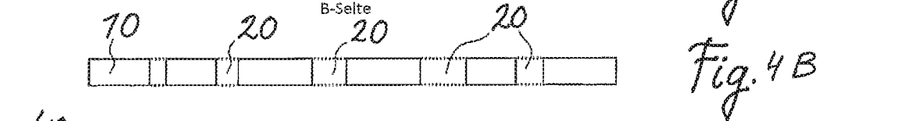
Figure 4C:
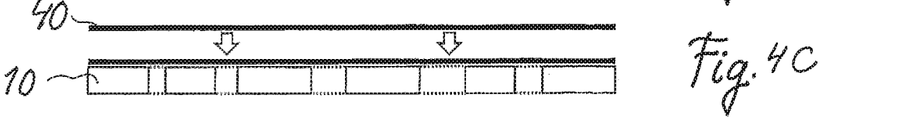

FIGS. 4A to 4G show step by step various stages of a method for the production of an interior trim part according to an example. Firstly, as shown in FIG. 4A, the support layer 10 is provided; the rear side of the support layer is designated as C side and the front side is designated as B side. The support layer 10 can be, for example, a pressed fiber-reinforced sheet of natural and synthetic fibers. As shown in FIG. 4B, a perforation 12 is cut into the support layer 10, wherein individual through-holes are formed for example by water jet cutting. As shown in FIG. 4C, then a translucent stabilizing layer 40 can be applied onto the front side or onto the rear side of the support layer 10, in order to close the openings of the perforation 12 and to counteract a weakening of the support layer 10 owing to the perforation 12. The stabilizing layer 40 is optional and can be provided on the front side of the support layer 10, so as not to prevent the integration of the illumination unit on the rear side. It can consist, for example, of a translucent film, a non-woven material, or a knitted material.

Figure 4D:
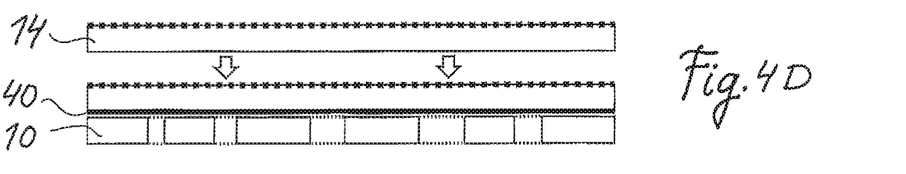

Then, as shown in FIG. 4D, the cover layer 14 is applied onto the front side of the support layer 10. The cover layer 14 can, as explained above, comprise a foam layer or spacer layer and a decorative layer. It can be laminated onto the support layer 10, if applicable with the use of an adhesive layer.

Figure 4E:
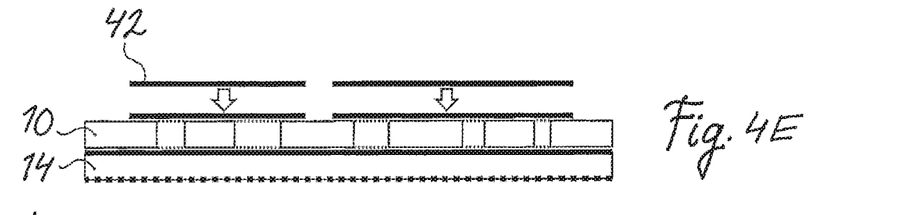
Figure 4F:
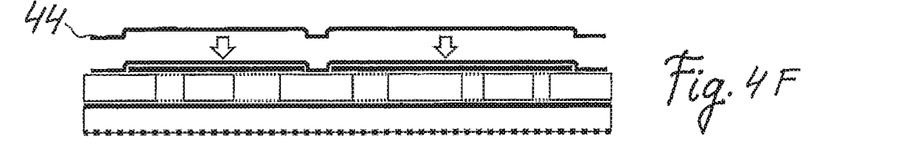

The production method continues in FIG. 4E, wherein the view of FIG. 4E is rotated through 180° with respect to FIG. 4D. In FIG. 4E, the illumination unit or a portion of the illumination unit, in the view of FIG. 4E a light-conducting sheet or foil 42, is applied onto the rear side or C side of the support layer 10. This illumination unit can, as shown in FIG. 4F, be covered by a covering layer 44 on the rear side of the interior trim part. The covering layer 44 can prevent light from emerging on the rear side of the trim part; it also can have light-forming properties, for example reflector properties.

Figure 4G:
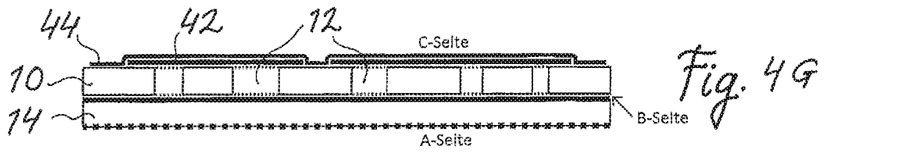
Figure 5:
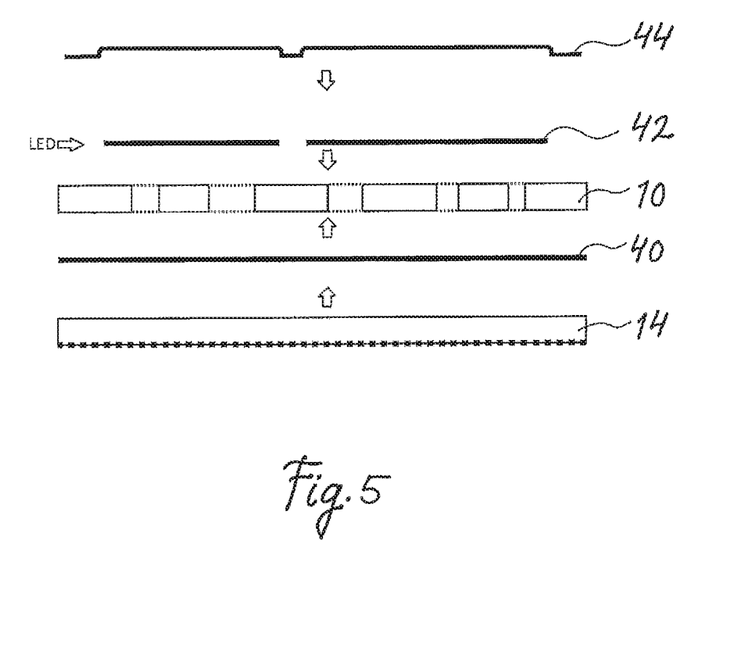
FIG. 5 shows a pulled-apart view of an interior trim part according to an example.

FIG. 4G shows a sectional view through a finished interior trim part, which is produced according to FIGS. 4A to 4F. The light-conducting sheet or foil 42 can be connected to a light source, for example an LED, in order to form the illumination unit. If individual light-conducting sheets or foils 42 are provided over different portions of the perforation 12, these portions can be illuminated independently of one another. FIG. 5 shows the interior trim part once again in exploded view. Reference is to be made to the description of FIGS. 4A to 4G.

The size and arrangement of the perforation is dependent on the desired optical effects and the desired illumination, but also dependent on the type and thickness of the support layer 10. Depending on the type, size and circumference of the perforation, it can be expedient to provide the additional stabilizing layer 40. The following values are to be understood as an example: the support layer 10 can be configured for example from a PU substrate with a thickness of 3-8 mm, or from an injection-molded polymer substrate with a thickness of 2-3.5 mm or from a pressed natural fiber substrate with a thickness of 1.2-3 mm. When the openings of the perforation 12 have a diameter of approximately 3-8 mm and a maximum length of approximately 500 mm, an additional stabilizing layer 40 may not be necessary. If, proceeding from the same materials of the support layer 10 the diameter of the perforation openings lies for example in the range of 5-15 mm, with a length in the order of 1200 mm, the use of a stabilizing layer can be expedient, in order to maintain the structural stability of the support layer. The support layer 10, perforation 12, cover layer 14 and if applicable stabilizing layer 40 can be adapted to one another so that the perforation is not noticeable on the front side of the interior trim part. If a reinforcement of the perforation is to be provided, for example injection-molded components or pressed fiber components, additional glass fiber mats or a translucent strip, which are applied locally, can be provided. A reinforcement of the perforation also can be provided by a metal component, for example a metal ring, or reinforcement integrated into the illumination unit.

Figure 6A:
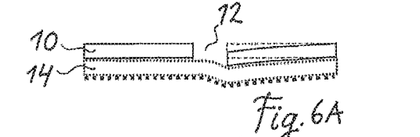
FIGS. 6A to 6C are views for explaining the adaptation of the illumination unit to the support layer.
Figures 6B, 6C:
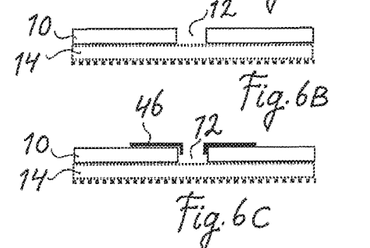

FIGS. 6A to 6C illustrate an effect which can arise owing to a deformation of the support layer 10 in the region of the perforation 12. FIG. 6B shows the ideal case, in which the structural stability of the support layer 10 is not impaired by the perforation 12. In the case of FIG. 6A, the support layer 10 is deformed in the region of the perforation 12, wherein this deformation is apparent through the cover layer 14 on the front side of the interior trim part. In FIG. 6C an additional reinforcing component 46 is provided in the region of the perforation 12, which counteracts the deformation shown in FIG. 6A. In this example, the reinforcing component 46 can be a synthetic material ring or metal ring or a strip or a foil or the like glued onto the rear side of the support layer 10.

Figure 7:
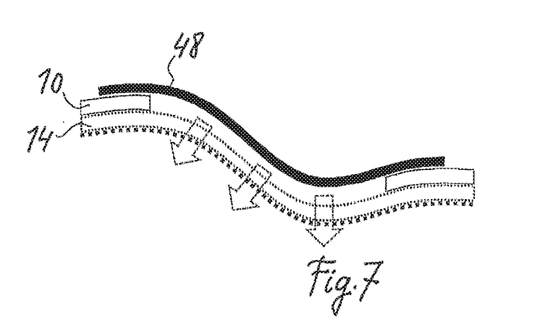
FIGS. 7 to 10 show sectional views through interior trim parts according to further examples.
Figure 8:
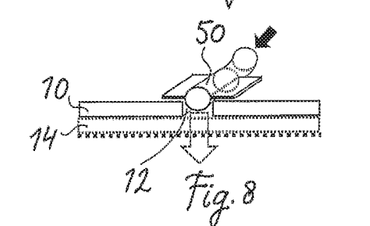
Figure 9:
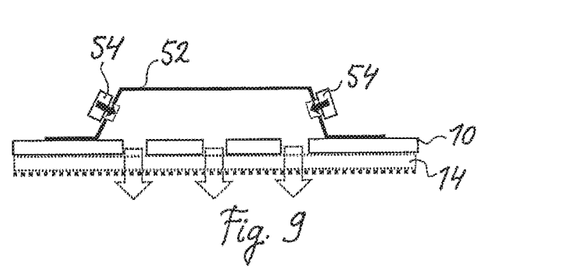
Figure 10:
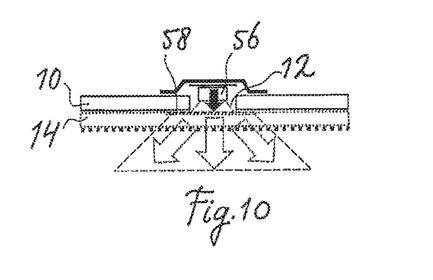

FIG. 7 shows an example of an interior trim part including a flexible light-conducting textile 48, for example of light-conducting PMMA fibers, as part of the illumination unit on the rear side of the support layer 10. FIGS. 8 to 10 show further examples of the illumination unit. The illumination unit of FIG. 8 comprises a light conductor 50, which is supplied from an LED light source, for example. The light conductor 50 can extend across several perforation openings 12 and supply them with light. The illumination unit of FIG. 9 comprises a light box 52, which in the example which is shown receives light from several LEDs and supplies several perforation openings with light. The light box 52 can have on its inner side a light-forming layer, for example a reflector layer or a diffusor layer. In the example of FIG. 10, the illumination unit comprises a housed LED 56, wherein the perforation opening 12 on the front side support layer 10 is covered by an additional light-forming layer 58, in this example a diffusor layer. Various light-forming films, strips or foils can be used. For example, a translucent strip can be provided with holographic or nano-lithographic micro-optics, in order to direct or deflect light emitted through the perforation opening, whereby the intensity, form and/or direction of the light can be manipulated. The strip can have a worked surface, in which optically effective shapes are formed, for example in order to shape a round light beam so that it appears as an elliptical, oval or rectangular spot. With such a light-forming strip, for example the light of an irregular light source, for example an LED strip, which produces individual spots of light, can be scattered and/or shaped, for example in order to form a homogeneous straight line of light. In another example, the light can be formed so that it is deflected through the optical strip. The layer 58 also can be colored.

Figure 11:
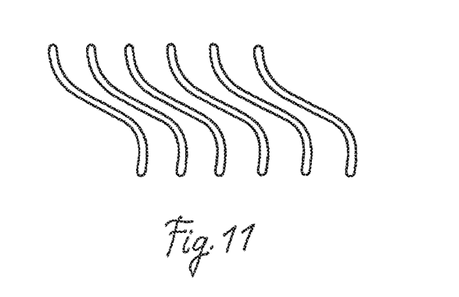
FIGS. 11-13 show examples of various perforations.
Figure 12:
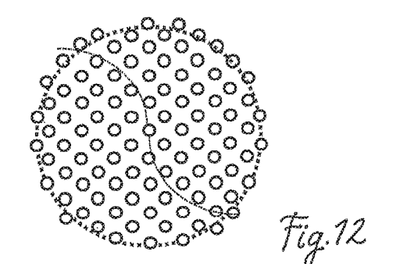
Figure 13:
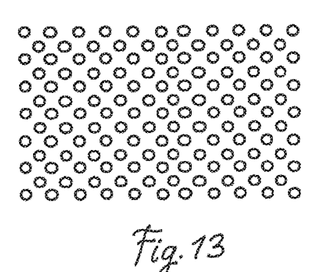

FIGS. 11 to 13 show various examples of the configuration of the perforation 12. As shown in FIG. 11, it can be configured in the form of straight or bent, curved, intertwined, plaited, intersecting or parallel lines. It can also, as shown in FIGS. 12 and 13, comprise punctiform through-holes which have a circular or polygonal or else irregular footprint. The through-holes can be arranged into a structure relative to one another so that through simultaneous or sequential illumination of several or individual through-holes a graphic pattern, an image or lettering can be represented. This is indicated in FIG. 12 by the curved line. Of course, different types of perforations also can be combined.

The illumination unit can be actuated by a control unit (not shown). Provision can be made that the light emitted through the individual through-openings of the perforation is switched on and off and/or is varied dynamically. A color change also is possible. For example an "input protocol" featuring a "welcome scenario" is conceivable, in which on opening of the vehicle doors or on starting of the engine, an illumination sequence runs. A coupling with the audio system of the motor vehicle and an actuation of the illumination unit as a function of the operation of the audio system also is conceivable. Furthermore, an actuation of the illumination unit as a function of the vehicle speed or of external occurrences, for example in order to warn the driver of danger, is conceivable. The illuminated interior trim part can provide ambient light for the orientation of the occupants; it can also serve as a reading light or other local illumination.

The illumination unit can be actuated by means of the on-board computer system, also designated as ECU (Electronic Control Unit), of the motor vehicle, but also by means of an external control apparatus, such as a mobile telephone, a tablet or a portable computer.

In addition to generating the optical effects by means of the illuminated perforation, graphic elements also can be provided in the cover layer 14, for example in the form of woven-in or printed structures, which can lie in one or more planes. Thereby, it is possible to produce a spatial or respectively three-dimensional impression and hence produce the impression of an extension of space.

The interior trim part can be produced using available tools and production methods, wherein the laminate of support layer 10 and cover layer 14 can be bonded and formed in a conventional manner. A structural weakening of the support layer owing to the perforation can be compensated if necessary by an additional stabilizing layer or stabilizing elements. The illumination unit and associated electronics can be arranged on the rear side of the interior trim part and are thereby easily accessible for maintenance and exchange. The illumination of the interior trim part is noticed only when light actually is emitted through the perforation; this function also is designated as "hidden until lit".

What is claimed is:

1. An interior trim part of a motor vehicle, comprising:
a support, wherein the support is a substrate of the interior trim part and has a front side and a rear side opposite the front side and is at least partially opaque,
a decorative cover applied to the front side of the substrate, wherein the decorative cover has a front side which provides an outermost surface of the interior trim part and has one or more layers,
an illumination unit, which emits light, applied to the rear side of the substrate,
wherein the substrate supports the decorative cover and the illumination unit, and includes a plurality of through-holes,
wherein the one or more layers of the decorative cover overlie each through-hole of the plurality of through-holes of the substrate and extend across both the front surface of the substrate and the plurality of through-holes of the substrate such that a same number of the one or more layers of the decorative cover extend across both the front surface of the substrate and the plurality of through-holes of the substrate,
wherein the decorative cover which overlies each through-hole of the plurality of through-holes has a uniformly closed surface and the through-holes are hidden until the illumination unit is activated,
wherein, when activated, the illumination unit is arranged to emit light into different combinations of through-hole arrangements of the plurality of through-holes, sequentially, with each of the different combinations of through-hole arrangements providing different illuminated structures, respectively, on the front side of the decorative cover overlying the lighted plurality of through-holes,
wherein, when activated, the illumination unit is arranged to emit light at a first time into a first combination of through-hole arrangements of the plurality of through-holes, and to emit light at a second time into a second combination of through-hole arrangements of the plurality of through-holes, with each of the first and second combinations of through-holes arrangements providing a first and second different illuminated structure, respectively, on the front side of the decorative cover overlying the lighted plurality of through-holes, and
wherein the first and second different illuminated structures are of an illumination sequence to generate moving illumination.

2. The interior trim part of claim 1, wherein each through-hole of the plurality of through-holes has a polygonal shape or a circular shape.

3. The interior trim part of claim 1, wherein at least one illuminated structure of the different illuminated structures is at least one of a graphic pattern, an image or at least one letter.

4. The interior trim part of claim 1, wherein the illumination unit is activated in response to a door of the motor vehicle being opened.

5. The interior trim part of claim 1, wherein the illumination unit is activated in response to an engine of the motor vehicle being started.

6. The interior trim part of claim 1, wherein the illumination unit is activated in response to an audio system of the motor vehicle being operated.

7. The interior trim part of claim 1, wherein the illumination unit is activated in response to speed of the motor vehicle.

8. The interior trim part of claim 1, wherein the illumination unit selectively illuminates the different combinations of the through-hole arrangements in a time sequence to produce an impression of animation or dynamics.

9. The interior trim part of claim 8, further comprising a control unit operatively coupled with the illumination unit to selectively illuminate the different combinations of the through-hole arrangements in the time sequence to produce the impression of animation or dynamics.

10. The interior trim part of claim 9, wherein the control unit controls the illumination unit to selectively illuminate the different combinations of the through-hole arrangements in the time sequence to produce the impression of animation or dynamics.

11. The interior trim part of claim 1, wherein the decorative cover comprises at least one of a textile, a foil, a synthetic leather, a leather or a perforated material.

12. The interior trim part of claim 11, wherein the textile comprises at least one of a non-woven textile, a woven textile or a knitted textile.

13. The interior trim part of claim 1, wherein the cover includes multiple layers.

14. The interior trim part of claim 1, wherein the cover is translucent.

15. The interior trim part of claim 1, wherein the cover is transparent.

16. The interior trim part of claim 1, wherein each through-hole of the plurality of through-holes has a linear shape or an elongated shape.

17. The interior trim part of claim 1, wherein the plurality of through-holes are arranged in a pattern, an image or at least one letter.

18. The interior trim part of claim 1, wherein the illumination unit comprises at least one of an LED, an OLED, an electroluminescence light source, a light conductor, or a light-conducting textile.

19. The interior trim part of claim 1, wherein the illumination unit is at least partially embedded in the substrate.

20. The interior trim part of claim 1, wherein the interior trim part is an instrument panel, door, side wall, center console, roof, or interior lining.

21. The interior trim part of claim 1, wherein the decorative cover comprises a foil or a synthetic layer.

22. The interior trim part of claim 1, wherein each through-hole of the plurality of through-holes has a same shape.

23. The interior trim part of claim 1, wherein all layers of the decorative cover overlie each through-hole of the plurality of through-holes of the substrate and extend across both the front surface of the substrate and the plurality of through-holes of the substrate.

24. The interior trim part of claim 1, wherein the illumination sequence is provided by the illumination unit being arranged to emit light at the first time into the first combination of through-holes of the plurality of through-holes without emitting light at the first time into the second combination of through-holes of the plurality of through-holes and to emit light at the second time into the second combination of through-holes of the plurality of through-holes without emitting light at the second time into the first combination of through-holes of the plurality of through-holes.

25. The interior trim part of claim 1, wherein:
- the interior trim part is a roof lining;
- the illumination unit comprises a flexible light-conducting textile applied to the rear side of the substrate, wherein the flexible light-conducting textile is formed of light-conducting optical fibers which each provide an optical waveguide, respectively; and
- the one or more layers of decorative cover comprises an outermost textile layer.

26. The interior trim part of claim 24, wherein the substrate is a pressed-fiber reinforced sheet.

27. The interior trim part of claim 25, wherein the pressed-fiber reinforced sheet is formed of natural and/or synthetic fibers.

\* \* \* \* \*